United States Patent
Phelps et al.

(10) Patent No.: US 7,436,763 B1
(45) Date of Patent: Oct. 14, 2008

(54) DATA COMMUNICATION APPARATUS WITH A DUAL MODE PROTECTION SWITCHING SYSTEM

(75) Inventors: Peter W. Phelps, Nepean (CA); Evert E. De Boer, Nepean (CA); Richard Trudel, Ile Bizard (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 939 days.

(21) Appl. No.: 10/207,810

(22) Filed: Jul. 31, 2002

(51) Int. Cl.
*H04J 3/14* (2006.01)
*H04J 14/00* (2006.01)
*G06F 11/00* (2006.01)

(52) U.S. Cl. .................. 370/219; 370/228; 340/825.01; 398/2; 714/4

(58) Field of Classification Search ................ 370/219, 370/228; 340/825.01; 398/2; 714/4
See application file for complete search history.

(56) References Cited

U.S. PATENT DOCUMENTS

| | | | | |
|---|---|---|---|---|
| 5,321,393 A | * | 6/1994 | Carlton et al. | 340/825.01 |
| 5,321,394 A | * | 6/1994 | Carlton et al. | 340/825.01 |
| 5,638,358 A | * | 6/1997 | Hagi | 370/228 |
| 5,838,924 A | * | 11/1998 | Anderson et al. | 709/239 |
| 5,937,029 A | * | 8/1999 | Yosef | 379/9.05 |
| 6,046,833 A | * | 4/2000 | Sharma et al. | 398/48 |
| 6,049,523 A | * | 4/2000 | Anderson et al. | 370/217 |
| 6,144,633 A | * | 11/2000 | Ikeda et al. | 370/217 |
| 6,202,170 B1 | * | 3/2001 | Busschbach et al. | 714/11 |
| 6,256,292 B1 | * | 7/2001 | Ellis et al. | 370/227 |
| 6,331,906 B1 | * | 12/2001 | Sharma et al. | 398/48 |
| 6,587,241 B1 | * | 7/2003 | Saleh | 398/92 |
| 6,724,880 B1 | * | 4/2004 | Lynch | 379/219 |
| 6,882,765 B1 | * | 4/2005 | Erickson et al. | 385/16 |
| 6,888,791 B1 | * | 5/2005 | Ellis et al. | 370/227 |
| 6,917,759 B2 | * | 7/2005 | de Boer et al. | 398/5 |
| 7,027,390 B2 | * | 4/2006 | Wakai et al. | 370/218 |
| 7,058,011 B1 | * | 6/2006 | Stearns et al. | 370/219 |

OTHER PUBLICATIONS

SONET Transport Systems: Common Criteria Network Element Architectural Features; GR-253-CORE Issue 2, Dec. 1995.

* cited by examiner

*Primary Examiner*—Alpus H Hsu
(74) *Attorney, Agent, or Firm*—Anderson Gorecki & Manaras LLP

(57) ABSTRACT

A data communication apparatus having a plurality of working ports for exchanging data traffic with a network element and at least one protection port. The communication apparatus also has a protection switching functional element to switch data traffic from a failed working port to the at least one protection port. The protection switching functional element is capable to acquire either one of a first mode of operation and a second mode of operation. The first mode of operation is an 1:Q mode using a single protection port where Q is the number of working ports and Q is equal or greater than 1. The second mode of operation is an M:N mode where M is the number of protection ports and N is the number of working ports, where M and N are greater than 1.

16 Claims, 3 Drawing Sheets

DATA COMMUNICATION APPARATUS WITH A DUAL MODE PROTECTION SWITCHING SYSTEM

FIELD OF THE INVENTION

The invention relates to the art of protection switching, in particular to devices and methods for providing a dual mode protection switching scheme for use in a data communication apparatus. The first mode of operation in a 1:Q mode where a single protection port is provided for a plurality of Q working ports. The second mode of operation is an M:N mode where M is the number of protection ports, N the number of working ports and M and N are greater than 1.

BACKGROUND OF THE INVENTION

A typical data communication apparatus that exchanges data traffic with network elements has working ports normally used to handle the data traffic and a protection port to which the data traffic can be switched if one or more of the working ports fail. Protection switching is handled by a protection switching functional element which receives a protection switch request, evaluates its priority, determines if protection may proceed based on network and local conditions, negotiates protection switching with the affected network element and coordinates the movement of data traffic.

Generally, existing protection switching schemes are limited to the 1:Q mode where a single protection line or channel is available to Q working lines or channels. The drawback of this arrangement resides in the limited protection available in the case of failures over multiple working lines or channels. When a working line or channel fails, the data traffic is switched to the protection line or channel. However, if a second working line or channel fails, no additional protection line or channel is available. If the second working line or channel carries higher priority data traffic than the first working line or channel, then the data traffic from the second working line or channel will be switched over the protection line, and the data traffic from the first working line or channel will be dropped.

Against this background there clearly appears that a need exists in the industry to provide a protection switching scheme that will increase the level of protection beyond the 1:Q.

SUMMARY OF THE INVENTION

Under a first broad aspect, the invention provides a data communication apparatus having a plurality of working ports and at least one protection port for exchanging data traffic with a network element. The communication apparatus also has a protection switching functional element to switch data traffic from a failed working port to at least one protection port. The protection switching functional element has capabilities to acquire a first mode of operation and a second mode of operation. The first mode of operation is an 1:Q mode using a single protection port, where Q is the number of working ports and Q is equal or greater than 1. The second mode of operation is an M:N mode where M is the number of protection ports and N is the number of working ports, where M and N are greater than 1.

The advantage of this approach is the ability of the communication apparatus to provide enhanced protection when the network element that exchanges data traffic with the communication apparatus also supports the M:N protection switching mode. At the same time, the communication apparatus remains fully compatible with older equipment that supports only the 1:Q mode.

In a specific and non-limiting example of implementation, the protection switching functional element includes a failure detector for sensing a failure in any one of the working ports and protection ports. The failures observed by the failure detector are reported to an arbiter that applies a series of rules to determine to which protection port the data traffic is to be switched. The remote network element uses similar protection switching functional element. Both arbiters exchange protection switching control data sent via a single or multiple protection lines. The protection switching control data allows each arbiter to be "aware" of each other's working ports failures at each end. When the rules that determine how each arbiter will manage a working port failure are consistent at both ends, decisions how to handle such failures shall also be consistent. This allows using a protocol for the protection switching control data, that remains the same for both modes of operation, that is M:N and 1:Q. In one specific example, the protocol is compliant with the GR-253-CORE.

It should be noted that a working port may fail as a result of a failure of the internal circuitry of the port or by the failure of the communication path to which the port is connected or a failure of the network element to which such communication path leads.

Under a second broad aspect, the invention provides a data communication apparatus having a plurality of working ports for exchanging data traffic with a network element, a plurality of protection ports and a protection switching functional element to switch data traffic from a failed working port to at least one of the protection ports. The protection switching functional element exchanges control data with a remote network element to manage switching of data traffic from a failed working port to one of the protection ports, the control data being exchanged with the remote network element via two or more of the plurality of protection ports.

Under a third broad aspect, the invention provides a method to configure a data communication apparatus to perform protection switching. The method includes:

a) if the network element that communicates with the communication apparatus supports an M:N protection switching mode where M is the number of protection ports, where M is greater than 1, and N is the number of working ports, where N is greater than 1, then:

i) assigning M ports of the plurality of ports of the communication apparatus as protection ports and N ports of the plurality of ports of the communication apparatus as working ports;

ii) configuring the protection switching functional element of the communication apparatus to operate in the M:N protection switching mode whereby data traffic from a failed working port of the M working ports can be switched over to any one of the N protection ports;

b) if the network element operates according to an 1:Q mode where a single protection port is available for Q working ports, where Q is equal or greater than 1, then:

i) assigning a single port of the plurality of ports as a protection port and Q ports of the plurality of ports as working ports;

ii) configuring the protection switching functional element to operate in an 1:Q mode whereby data traffic over a failed working port can be switched over to the single protection port.

BRIEF DESCRIPTION OF THE DRAWINGS

A detailed description of examples of implementation of the present invention is provided hereinbelow with reference to the following drawings, in which.

Figure 1:
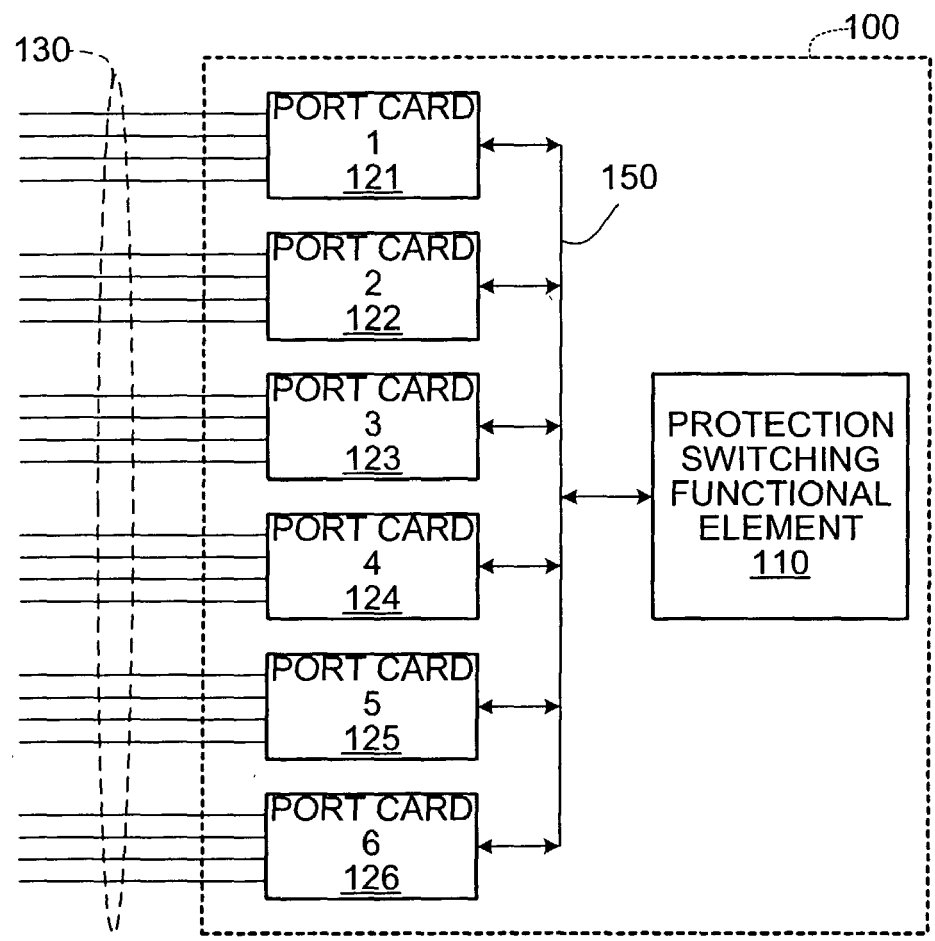
FIG. 1 is a block diagram of a data communication apparatus using a dual mode protection switching system.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 shows a data communication apparatus 100 with a dual mode protection switching system. The data communication apparatus 100 may be any apparatus, such as a SONET/SDH ADM that exchanges data traffic with a remote network element. The data communication apparatus 100 comprises a plurality of port cards 121-126, each implementing one or more ports. Each port connects to one of a plurality of communication paths 130, which may be, for example, metallic conductors or optical fibers. FIG. 1 shows a particular implementation comprising six port cards 121-126, each port card 121-126 being connected to four communication paths 130. Therefore, each port card 121-126 implements four ports. The reader skilled in the art will readily appreciate that the telecommunication apparatus 100 may comprise any number of port cards connected to any number of communication paths.

In the example shown of FIG. 1, each port card 121-126 connects to one or more switch cards, which are not shown in the drawings for clarity.

The data communication apparatus 100 includes an interconnect mechanism 150 connecting to all the port cards 121-126. The interconnect mechanism 150 connects the port cards 121-126 to a protection switching functional element 110. Briefly, the purpose of the protection switching functional element 110 is to manage failures occurring over any one of the working ports of the port cards 121-126. The protection switching functional element 110 is shown for clarity as a single block but this is not to be construed as a limitation. More specifically, the protection switching functional element 110 can be of distributed nature, where different components of the protection switching functional element 110 reside in different locations.

In one specific example of implementation, one or more components of the protection switching functional element can be integrated in one or more switch cards of the data communication apparatus.

All the port cards 121-126 are identical from the standpoint of protection infrastructure and communication infrastructure. However, the port cards may not be identical from the standpoint of traffic carrying capacity of the ports.

Figure 2:
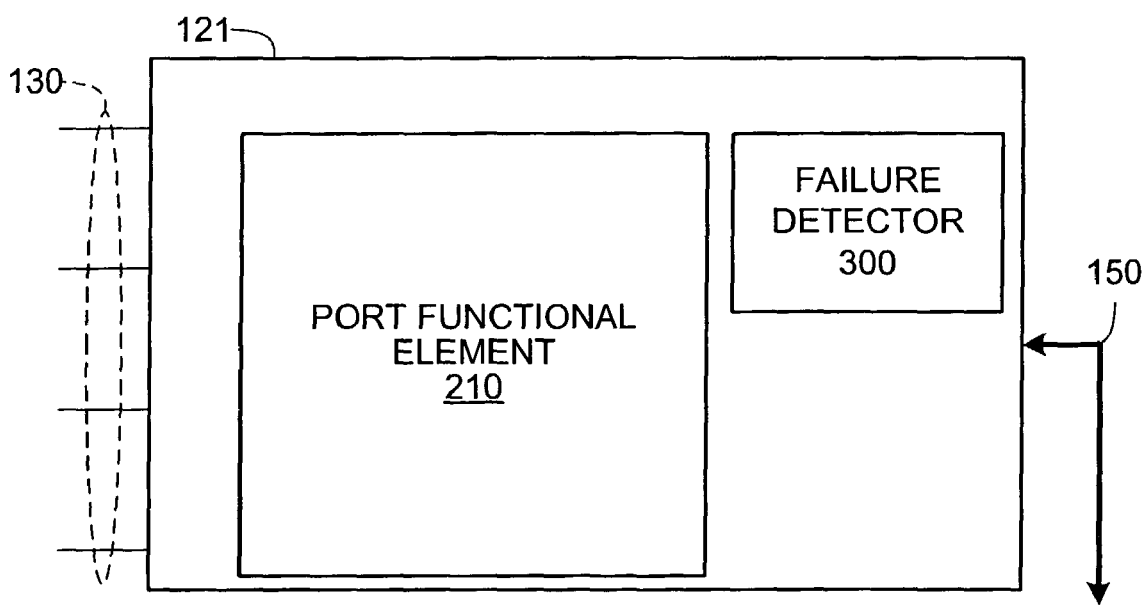
FIG. 2 is a more detailed block diagram of a port card of the data communication apparatus shown at FIG. 1.

For simplicity, only port card 121 will be described, it being understood that this description also applies to the rest of the port cards 122-126. As shown in FIG. 2, the port card 121 comprises a port card functional element 210, which globally designates the various components and functions of the port card 121 in order to allow the port card 121 to exchange data traffic with a remote network element. Examples of such components include interfaces, receivers, transmitters, etc. These components will not be described in detail because they are conventional. The port card functional element 210 communicates with the various switching functional elements 110 to which the port card 121 connects. Thus, data received from a network element passes through the port card functional element 210 and it is then transferred to one or more of the switch cards. Similarly, data to be sent to a network element is delivered from one or more of the switch cards to the port card functional element 210 and then released into one or more of the ports on the port card 121.

The port functional element 210 includes a failure detector 300 that designates globally the various devices and functions designed to detect malfunctions, in particular failures that prevent a port (working port or protection port) of the port card 121 to send data or receive data. Such a port failure may be caused by a failure of the port card itself, a failure of the communication path 130 connected to the port, or a failure of the network element to which the port leads. FIG. 2 shows an arrangement where the failure detector 300 is integrated in the port card 121. Alternatively, the failure detector 300 can be implemented as a central entity, communicating with the various port cards 121-126 via the interconnect mechanism 150.

Figure 3:
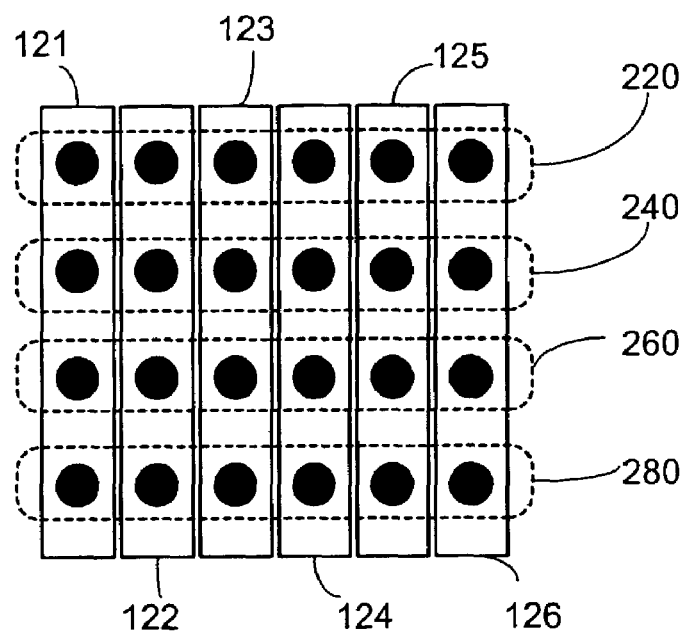
FIG. 3 is a front view of a cabinet in which the various port cards of the data communication apparatus of FIG. 1 are inserted.

The various ports on the port cards 121-126 are arranged into protection groups of any sequence. A protection group can be defined as a set of ports that has working ports and at least one protection port. FIG. 3 shows an example of how ports can be grouped to form protection groups. The ports of the port cards 121-126 are arranged into four protection groups 220-280. Each protection group includes one or more protection ports and remainder of the ports are working ports. Any one or more of the ports in a protection group can be designated as protection port.

It should be appreciated that the selection of the ports on the port cards 121-126 that form a given selection group is a matter of choice. In FIG. 3, ports from each port card 121-126 along a common row form a protection group. Alternatively, all the ports in two rows can form a protection group. Yet another possibility is to consider all the ports in a given port card 121-126 as members of the same protection group.

The protection switching functional element 110 manages the protection switching function with regard to each protection group 220-280. It should be noted that each protection group 220-280 is a separate entity and operates independently from any other protection group 220-280. Accordingly, the protection switching functional element 110 can be viewed as a collection of protection switching elements, each being assigned to a respective protection group 220-280. Although some components can be shared among the collection of protection switching elements, each element implements an independent protection switching logic.

Figure 4:
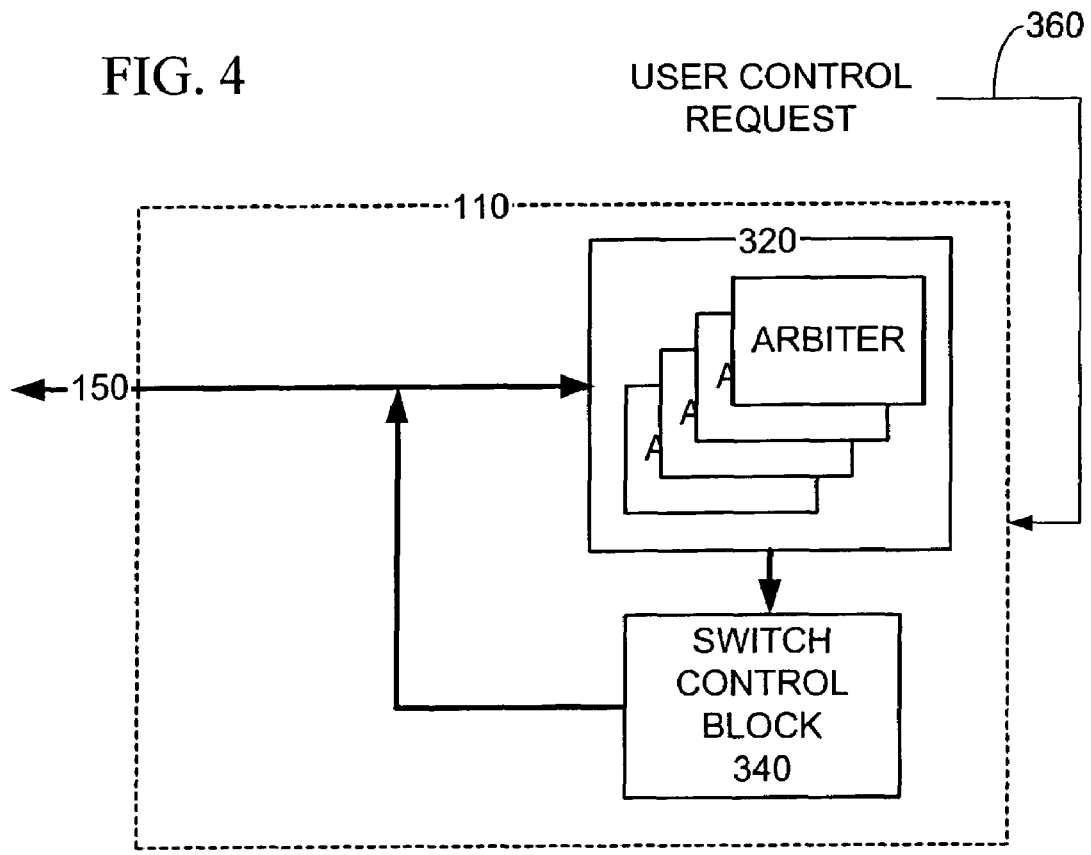
FIG. 4 is a more detailed block diagram of the protection switching functional element of the data communication apparatus shown in FIG. 1.

FIG. 4 is more detailed block diagram of the protection switching functional element 110. The protection switching functional element 110 has an arbiter 320, which applies a series of rules to determine to which protection port the data traffic from a failed working port is to be switched. The arbiter 320 communicates with the failure detector 300 in each port card 121-126 via the interconnect mechanism 150. The failure detector 300, as discussed earlier reports port failures to the arbiter 320. In the implementation shown in the drawings, the arbiter 320 is software implemented. Several instances of the arbiter are being executed concurrently, each instance being associated with a respective protection group 220-280. Other implementations are possible without departing from the spirit of the invention. For example, the arbiter can be implemented partly in hardware and partly in software. Also a central entity can be used that manages the protection switching over the four protection groups 220-280.

The protection switching functional element 110, as it relates to a given protection group has two modes of operation. The first mode of operation is a 1:Q mode using a single protection port, where Q is the number of working ports, and Q is equal or greater than 1. The second mode of operation is an M:N mode, where M is the number of protection ports in a protection group and N is the number of working ports in that port group. M and N are greater than 1. Note that Q can be equal to N or different from N.

The first mode of operation is compliant with the requirements defined in Synchronous Optical Network (SONET) Transport Systems: Common Generic Criteria, Telcordia Technologies GR-253-CORE Issue 3 Sep. 2000. This document is hereby incorporated by reference. Under this mode of operation, the arbiter 320 (or instance thereof associated to the respective protection group) exchanges protection switching control data with the remote network element to which the communication apparatus 100 is connected. The control information uses a K-byte time slot, such as the K1 and K2-byte slots in the SONET or SDH data frame.

The second mode of operation is the mode above the first mode and it is distinguished from the first mode by the increased number of protection ports in a given protection group. In a typical application the protection group may include a total of 8 ports with 6 working ports and 2 protection ports (hence M=2 and N=6. In another possible application, the protection group has 14 ports with 3 protection ports and 11 working ports (hence M=3 and N=11). The reader will appreciate that other working ports/protection ports combinations exist without departing from the spirit of the invention.

During the second mode of operation the protection switching control data exchanged between the arbiter (or instance thereof associated with the respective protection group) and the remote network element, uses the same protocol as the protocol used during the first mode of operation. In a specific and non-limiting example of implementation, this protocol is compliant with GR-253-CORE.

When the data communication apparatus 100 operates in the second mode of operation, protection switching control data can be exchanged with the remote network element via one or more of the protection ports. The availability of several protection ports over which the protection switching control data can be exchanged allows multiple switching requests to be transmitted concurrently between the arbiters 320 at each end.

The data communication apparatus 100 can operate in the second mode of operation only if the remote network equipment is also capable to operate in such second mode. In the instance the remote network equipment only functions under the first mode, that is using a single protection port per protection group, then the data communication apparatus is set to operate in the first mode.

The mode selection is usually made during the installation of the data communication apparatus 100 in the network. If the remote network element to which the data communication apparatus 100 connects supports an M:N protection switching mode where M and N are greater than 1, then M ports of the protection group are assigned as protection ports and N ports of the protection group are assigned as working ports. Next the protection switching functional element is configured to operate in the M:N protection switching mode whereby data traffic from a failed working port of the N working ports can be switched over to any one of the M protection ports. Such configuration can be done by changing parameters of the respective arbiter (or instance thereof associated to the protection group), by any suitable means.

On the other hand, if the remote network element operates according to a 1:Q mode where a single protection ports is available for Q working ports, then a single port of the protection group is designated as protection port and Q ports of the protection group as working ports. Next, the protection switching functional element is configured to operate in an 1:Q mode whereby data traffic over a failed working port can be switched over to the single protection port.

In a possible variant, the mode selection can be made dynamically. This can be accomplished by providing the data communication apparatus 100 with a suitable auto-discovery mechanism that allows determining the mode capability of the remote network equipment. Once the mode capability of the remote network equipment has been identified, the data communication apparatus 100 can acquire the proper mode automatically.

The protection switching functional element 110 also includes a switch control block 340 that receives control signals from the arbiter 320 and that communicates with the various port cards 121-126 via the interconnect mechanism 150. The purpose of the switch control block is to switch the data flow from one port to another following a decision made by the arbiter 320. FIG. 4 also illustrates an additional input 360 to arbiter 320 designating various user control inputs, such as explicit user requests to switch the data flow from a given working port to a protection ports.

Figure 5:
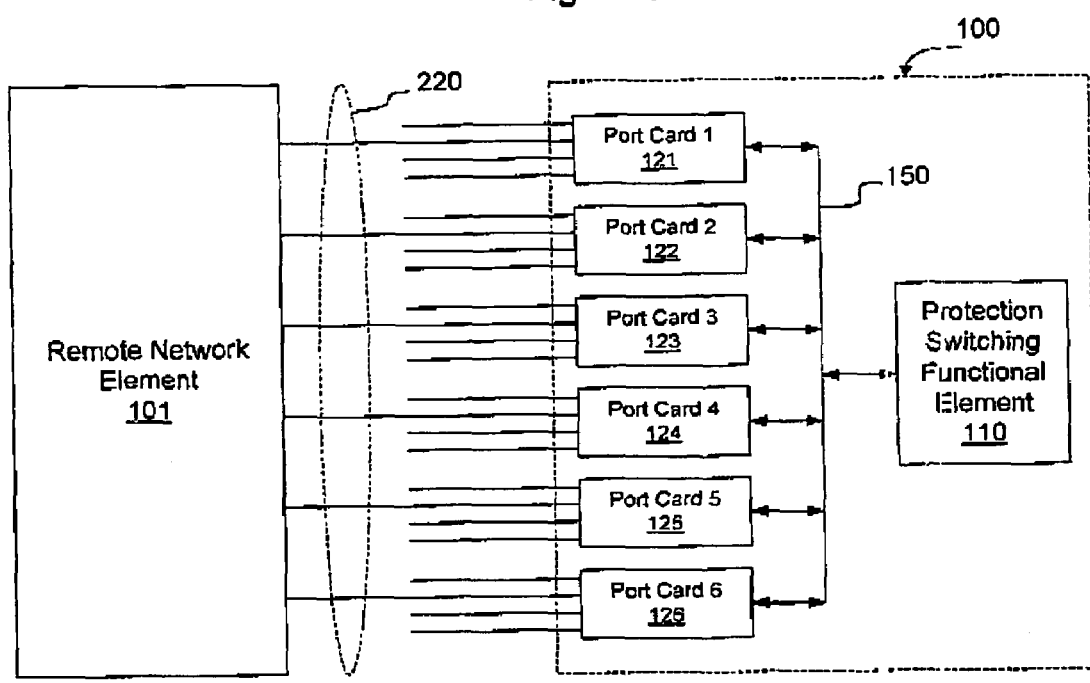
FIG. 5 is a functional block diagram of the data communication apparatus of FIG. 1 interconnected by a protection group to a remote network element.

FIG. 5 shows one example of a data communication apparatus 100 connected to a remote network element 101 via a protection group 220. In the example shown in FIG. 5, the remote network element 101 and data communication apparatus 100 are interconnected via a plurality of lines or channels. A selection of the lines/channels has been selected to form a protection group 220.

An example of operation of the data communication apparatus 100 will, under the second mode of operation will now be described in connection with the following tables. In those examples, it is assumed that there are two protection ports to be used (M=2). The initial state and the final state of these ports is given in each instance together with the requests that cause the action that occurs. The generic hierarchy of the protection switching requests is defined in GR-253-CORE. The examples appearing in the following tables illustrate possible arbiter rules when multiple requests occur simultaneously and multiple protection channels are available to apply those rules. Please note that these requests may be considered extreme cases because all inputs are considered to occur at the same time but in practice this will rarely (if ever) occur except under some unusual circumstances where local and remote requests are different but received simultaneously because perhaps of unidirectional failures at each end. The examples show the defined rules and consequent priorities that would take effect if such coincidences should occur.

The examples below assume a bi-directional M:N protection scheme, where M=2.

TABLE 1

Example - Different priority requests on different channels

| | ←Data communication apparatus 100→ | | | ←Remote network element→ | | |
|---|---|---|---|---|---|---|
| Working Port | Priority of request | Protection port | | Working Port | Priority of request | Protection port |
| | No Request | P1 | Initial state | | No Request | P1 |
| | No Request | P2 | Initial state | | No Request | P2 |
| W3 | Man | P1 | Requests | W5 | Force | P1 |
| W5 | Remote Force | P1 | Final state | W5 | Force | P1 |
| W3 | Man | P2 | Final state | W3 | Remote Man | P2 |

In this example, working port 3 (W3) is making a manual request to switch over to protection port 1 (P1), at the data communication apparatus 100. At the same time, working port (W5) is making a forced request to switch over to P1, at the remote network element. In the final state, W5 gets protected on P1 because W5 is making a higher priority request. W3 gets protected on P2.

In this example, W4 is making a signal degradation (SD) request to switch over to P1, at the data communication apparatus 100. At the same time, W3 is making a signal failure (SF) request to switch over to P1, at the remote network element. Also, W3 is making an SF request to switch over to P2 at the data communication apparatus 100 and W5 is making a manual request to switch over to P2 at the remote

TABLE 2

Example - Equal priority requests on different channels

| | ←Data communication apparatus 100→ | | | ←Remote network element→ | | |
|---|---|---|---|---|---|---|
| Working Port | Priority of request | Protection port | | Working Port | Priority of request | Protection port |
| | No Request | P1 | Initial state | | No Request | P1 |
| | No Request | P2 | Initial state | | No Request | P2 |
| W2 | Man | P1 | Requests | W3 | Man | P1 |
| W2 | Man | P1 | Final state | W2 | Remote Man | P1 |
| W3 | Remote Man | P2 | Final state | W3 | Man | P2 |

In this example, W2 is making a manual request to switch over to P1, at the data communication apparatus 100. At the same time, W3 is making a manual request to switch over to P1, at the remote network element. In the final state, W2 gets protected on P1 because W2 is the lowest port number of the equal priority requests. W3 gets protected on P2.

network element. In the final state, W3 gets protected on P1 because it is the highest priority request and W4 gets protected on P2 because it is the next highest priority. W5 does not get protected: this request is denied because of insufficient priority with respect to the other two requests.

TABLE 3

Example - Different priority requests on different channels

| | ←Data communication apparatus 100→ | | | ←Remote network element→ | | |
|---|---|---|---|---|---|---|
| Working Port | Priority of request | Protection port | | Working Port | Priority of request | Protection port |
| | No Request | P1 | Initial state | | No Request | P1 |
| | No Request | P2 | Initial state | | No Request | P2 |
| W4 | SD | P1 | Requests | W3 | SF | P1 |
| W3 | SF | P2 | Requests | W5 | Man | P2 |
| W3 | SF | P1 | Final state | W3 | SF | P1 |
| W4 | SD | P2 | Final state | W4 | Remote SD | P2 |

TABLE 4

Example - Different priority requests on different channels

| ←Data communication apparatus 100→ | | | | ←Remote network element→ | | |
|---|---|---|---|---|---|---|
| Working Port | Priority of request | Protection port | | Working Port | Priority of request | Protection port |
| W4 | Man | P1 | Initial state | W4 | Remote Man | P1 |
|  | No Request | P2 | Initial state |  | No Request | P2 |
| W3 | SF | P2 | Requests | W5 | SD | P2 |
| W5 | Remote SD | P1 | Final state | W5 | SD | P1 |
| W3 | SF | P2 | Final state | W3 | Remote SF | P2 |

In this example, W4 has completed a manual request and has switched over to P1, at the data communication apparatus 100. Now, W3 is making an SF request to switch over to P2 at the data communication apparatus 100 and W5 is making an SD request to switch over to P2 at the remote network element. In the final state, W3 gets protected on P2 because it has a higher priority than W5 and P2 is available. The next highest priority gets to preempt the channel already being protected, so W5 preempts W4 on P1 because it is of higher priority than W4. W5 doesn't preempt W3 (on P2) because it is of lower priority than W3.

As it appears from the above examples, the arbiters 320 (or instances thereof associated to the respective protection group) apply predefined rules to given failure conditions to determine which working channel gets protected on which protection channel. When the rules are consistent at each end (at the data communication apparatus 100 and at the remote network element), consistent resolutions will be reached at each end.

The predefined rules that govern the operation of each arbiter 320 (or instances thereof associated to the respective protection group) can greatly vary and will reflect the desired response given a set of failure conditions. Many such sets of rules can be devised without departing from the spirit of the invention. For illustration purposes, examples of rules have been provided below, it being understood that the invention is not limited to those examples.

The arbiter (or instances thereof associated to the respective protection group) at each end shall determine its M highest priority failures, conditions or requests for protection and rank them 1, 2, . . . M. The arbiter (or instances thereof associated to the respective protection group) should therefore know all local priorities of all channels in order to rank them. It shall also see and consider in this ranking process the remote switch request priorities as sent in the K-bytes via each protection port via the K-bytes. Note that an arbiter (or instances thereof associated to the respective protection group) may not see all remote switch requests—but only the highest priorities as sent in the K-bytes on one or more protection channels. If the local request is of higher priority than the remote request then the remote request shall be removed by the remote network element and the local request shall be acknowledged with a rev-req code.

The port with the highest priority request should be given the lowest numbered protection port available. This means that if more than one protection port is available, then the requests shall be placed on protection in order—highest priority on P1, second highest priority on P2, etc.

Once a working port is using a protection port, that working port shall not be moved to use another protection port just to use a lower (or higher) protection port member if one should become available. However, a somewhat similar but valid move scenario is when a request (A) on protection is preempted by request (B) and later request (A) may be protected again by another protection port. This is a valid indirect 'move' because it involves preemption. Another valid move scenario could occur if a protection port should fail and require the working channel using it to be switched to another protection port.

If one or more protection port is already in use with a request, then a new highest or second highest priority request shall be placed on the first available protection port. The applicable general rule is: complete the highest priority first on any available protection port and then look at possible preemptions. A protection switch request of any priority shall not preempt another channel on protection if an available protection port exists. (Note that extra traffic on a port is considered an available channel).

There is no difference in the priority of protection ports—either one is equally suited to whatever line or request is made of it. For example, if P1 is in use and P2 is available, then if a subsequent higher priority request than that on P1 occurs on another working port occurs, then that new request shall be assigned to P2 and not preempt the already protected traffic on P1.

If two (assuming M=2) protection ports are already in use, and a third higher priority request occurs, then the working port with the lowest priority that is using protection shall be preempted by the new and higher priority request.

If two equal priority requests are being protected on two protection ports and a third request occurs of a higher priority, then the higher numbered working port shall be the port preempted by the higher priority switch request.

For equal priority working ports requests, a lower port number switch request shall not preempt a completed protection switch from a port with a higher (or lower) port number. To preempt, a request must have a higher priority regardless of port number.

If the priorities of two working port requests are equal and there is only one protection port available, then the request from the working port with the lowest port number shall be granted.

If the priorities of two requests are equal and there are two protection port available then the request from the working port with the lowest port number shall be granted (as if it was a higher priority request) on the lowest numbered protection port. The request from the other working port with a higher port number shall be granted on the next available higher protection port.

If two equal priority requests are presented to the arbiter (or instances thereof associated to the respective protection group) at the same time, then it shall choose to protect the lower numbered working port prior to protecting the higher numbered working port (i.e., protect Wx before Wy where x<y). The generic rule being—lower numbered working port requests take precedence over higher numbered working port requests in the presence of otherwise equal switch requests.

Given that two simultaneous requests are virtually impossible to occur at the same network element, because requests are presented in sequence via software message queues, the situation described in the paragraph immediately above is not likely to happen. The only way it could happen is if the two ends of a line see different ports failure. Before the protection switch is completed for either one of these failed ports, the arbiters (or instances thereof associated to the respective protection group) would compare local and remote request priorities and if they are the same then compare port numbers. The port with the lower port identifier number shall then be given priority and granted access to protection.

Protection ports or channels are signaled (indicated) on their respective protection port K-bytes with an ID of 0. Also, the K-byte protocol of the port does not indicate that this is a first, second or third priority request. The K-bytes are not designed to indicate the relative priority with respect to another priority that might be present. They can only indicate the priority of the port request or failure that is currently being requested of and on that line.

If all request priorities are equal and they are greater than NO_REQUEST then the order of getting them protected is the order in which they appeared. They do not preempt each other.

If all priorities are equal and they are equal to NO_REQUEST then none of them are requesting protection and so the ports on protection shall be the protection ports themselves. Extra traffic, if enabled, shall be allowed in this condition.

The arbiter (or instances thereof associated to the respective protection group) shall not assign the same working port to be protected by more than one protection member at any one time.

If the two ends of the line differ in what they see as the highest priority request, then that shall be resolved in the same way as it is done with 1:Q protection. One end shall give way to the higher priority request from the other end. If the two priorities are equal but are making requests for different ports, then the lower port number shall take precedence.

A working port on protection shall have priority to remain using that protection port over any other request for protection whenever any of the following are true:
another protection port is available, or
the port using protection is of equal or higher priority than the incoming request.

Assignment of high and low port grade of service may be provisioned or assigned by the user if required—low priority grade of service is default. This enables otherwise equal priority requests to be resolved by the arbiter.

The assignment and connectivity of protection ports and working ports between the two ends of the line must be consistent at protection group or member creation and remain consistent for proper operation of the protection group.

Working port signaling is not specifically required in a 1:Q or M:N protection scheme.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A data communication apparatus, comprising:
a) a protection group having a plurality of working ports for exchanging data traffic with a remote network element and at least one protection port;
b) a protection switching functional element to switch data traffic from a failed working port to said at least one protection port, said protection switching functional element capable to acquire either one of a first mode of operation and a second mode of operation;
  i. said first mode of operation being an 1:Q mode using a single protection port in said protection group where Q is the number of working ports in said protection group and Q is equal or greater than 1;
  ii. said second mode of operation being an M:N mode where M is the number of protection ports and N is the number of working ports in said protection group, where M and N are greater than 1.

2. A data communication apparatus as defined in claim 1, wherein said protection switching functional element includes an arbiter for exchanging protection switching control data with the remote network element.

3. A data communication apparatus as defined in claim 2, wherein said arbiter is operative for resolving switching requests and allocating data traffic from failed working ports to at least one protection port.

4. A data communication apparatus as defined in claim 2, wherein said protection thing control data in said first and second modes of operation is generated according to a common protocol.

5. A data communication apparatus as defined in claim 4, wherein said common protocol is compliant with GR-253-CORE.

6. A data communication apparatus as defined in claim 2, wherein said protection switching functional element includes a failure detector for sensing a failure of any one of the working ports of said protection group.

7. A data communication apparatus as defined in claim 6, wherein said failure detector communicates with said arbiter to report to said arbiter failures of any one of the working ports.

8. A data communication apparatus as defined in claim 6, wherein said failure detector communicates with said arbiter to report to said arbiter failures of any one of the protection ports.

9. A data communication apparatus as defined in claim 2, wherein in said second mode of operation said arbiter being operative to exchange protection switching control data with the remote network element over more than one of the protection ports.

10. A data communication apparatus as defined in claim 9, wherein in said first mode of operation said arbiter being operative to exchange protection switching control data with the remote network element solely over said one protection port.

11. A data communication apparatus as defined in claim 10, wherein the protection switching control data is transmitted in a K-byte slot of either one of a SONET and SDH data frame.

12. A data communication apparatus as defined in claim 11, wherein the protection switching control data is transmitted in a K1 and K2 byte slots of either one of a SONIC and SDH data frame.

13. A data communication apparatus as defined in claim 1, wherein each of said working and protection ports are suitable for connection to respective optical communication paths.

14. A data communication apparatus as defined in claim 2, wherein said arbiter is at least partly implemented in software.

15. A data communication apparatus, comprising:
  a) a protection group having a plurality of working port means for exchanging data traffic with a remote network element and at least one protection port means;
  b) a protection switching functional element means to switch data traffic from a failed working port means of said protection group to said at least one protection port means of said protection group, said protection switching functional element means capable to acquire either one of a first mode of operation and a second mode of operation;
    i) said first node of operation being an I:Q mode using a single protection port means in said protection group where Q is the number of working port means in said protection group and Q is equal or greater than 1;
    ii) said second mode of operation being an M:N mode where M is the number of protection port means in said protection group and N is the number of working port means in said protection group, where M is greater than 1 and N is greater than 1.

16. A method to configure a data communication apparatus to perform protection switching, the data communication being suitable to exchange data traffic with a remote network element, the data communication apparatus having a protection group including a plurality of ports and a protection switching functional Clement said method comprising:
  a) if the remote network element is operating in an M:N protection switching mode where M is the number of protection ports in the protection group, where M is greater than 1, and N is the number of working ports, where N is greater than 1, then:
    i) assigning M ports of the plurality of ports as protection ports and N ports of the plurality of ports as working ports;
    ii) configuring the protection switching functional element to operate in the M:N protection switching mode whereby data traffic from a failed working port of the N working ports can be switched over to any one of the M protection ports;
  b) if the remote network element, is operating in an 1:Q mode where a single protection ports is available for Q working ports, where Q is equal or greater than 1, then:
    i) assigning a single port of the plurality of ports as a protection port and Q ports of the plurality of ports as working ports;
    ii) configuring the protection switching functional element to operate in an 1:Q mode whereby data traffic over a failed working port can be switched over to the single protection port.

* * * * *